US006678107B1

(12) United States Patent
Krehbiel et al.

(10) Patent No.: US 6,678,107 B1
(45) Date of Patent: Jan. 13, 2004

(54) SYSTEM AND METHOD FOR READING AND WRITING N-WAY MIRRORED STORAGE DEVICES

(75) Inventors: Stanley E. Krehbiel, Wichita, KS (US); Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 99 days.

(21) Appl. No.: 09/883,142

(22) Filed: Jun. 15, 2001

(51) Int. Cl.[7] .................................................. G11B 5/09
(52) U.S. Cl. ........................................... 360/53; 360/31
(58) Field of Search ..................................... 360/53, 31

(56) References Cited

U.S. PATENT DOCUMENTS 5,126,889 A * 6/1992 Walden ....................... 360/53
6,023,780 A * 2/2000 Iwatani ....................... 714/770
6,434,720 B1 * 8/2002 Meyer ........................ 714/820
6,442,727 B1 * 8/2002 Jones ......................... 714/766

* cited by examiner

*Primary Examiner*—David Hudspeth
*Assistant Examiner*—Varsha A. Kapadia
(74) *Attorney, Agent, or Firm*—Suiter-West PC LLO

(57) ABSTRACT

The present invention is directed to a system and method for reading and writing N-way mirrored storage devices. A method of reading data in a data storage system, where the data storage system may include a first data storage device, a second data storage device and a third data storage device, is provided. A first item of data is read from a first data storage device, a second item of data is read from a second data storage device, and a third item of data is read from a third storage device. The first item of data from the first storage device is compared with the second item of data from the second storage device and the third item of data from the third storage device. If the first item of data matches at least one of the second item of data and the third item of data, the first item of data is valid. If the first item of data does not match at least one of the second item of data and the third item of data, the second item of data is valid.

34 Claims, 6 Drawing Sheets

SYSTEM AND METHOD FOR READING AND WRITING N-WAY MIRRORED STORAGE DEVICES

FIELD OF THE INVENTION

The present invention generally relates to the field data storage systems, and particularly to a system and method for reading and writing N-way mirrored storage devices.

BACKGROUND OF THE INVENTION

The efficient and persistent storage of electronic data is one of the most important aspects of modern business. Electronic data may contain information from all aspects of business and life in general. Therefore, data must not only be stored efficiently and effectively, but that data must also be stored in a manner to ensure the veracity of the data. Corruption of this data may have enormous consequences, especially in instances in which the error is not "caught", which may cause incorrect results and further inefficiencies. One method and system utilized to promote data integrity is a redundant array of inexpensive disks (RAID) system, which may provide a group of drives in a system that will continue to provide access to data even in the event of drive failure. However, data corruption may still occur in a RAID system. For example, data corruption has occurred in the past because disk drives had erroneously reported successful completion of WRITE commands that had not, in fact, been successfully completed. This may occur due to disk drive vendor defects, and the like.

Additionally, some controllers of RAID system may not handle "unreliable drive" type errors. One method of addressing this problem was to rely on rigorous pre-certification of disk drives, but such a reliance may be unsuitable as certain manufacturers may desire further guarantees of drive reliability. Other methods utilized to address this problem include a separate "data scrubber" process, issue all write requests with verify requested, calculate and store a CRC along with the data, and the like. However, these solutions may involve significant performance degradation. Further, the inclusion of CRC may require specialized CRC hardware in order to avoid performance degradation, thereby making such an option unsuitable for existing devices and may require extensive modifications.

Therefore, it would be desirable to provide a system and method for data verification in a RAID system.

SUMMARY OF THE INVENTION

Accordingly, the present invention is directed to a system and method for reading and writing N-way mirrored storage devices. In a first aspect of the present invention, a method of reading data in a data storage system is provided, wherein the data storage system includes at least a first data storage device, a second data storage device and a third data storage device. A first item of data is read from a first data storage device, a second item of data is read from a second data storage device, and a third item of data is read from a third storage device. The first item of data from the first storage device is compared with the second item of data from the second storage device and the third item of data from the third storage device. If the first item of data matches at least one of the second item of data and the third item of data, the first item of data is valid. If the first item of data does not match at least one of the second item of data and the third item of data, the second item of data is valid.

In a second aspect of the present invention, a data storage system includes a first storage device, a second data storage device, and a third data storage device, the storage devices suitable for storing electronic data. The first storage device includes a first item of data, the second storage device includes a second item of data, and the third storage device includes a third item of data. A storage device controller is coupled to the first storage device, the second storage device and the third storage device. The storage device controller reads the first item of data from the first data storage device, the second item of data from the second data storage device and the third item of data from the third data storage device and compares the first item of data from the first storage device with the second item of data from the second storage device and the third item of data from the third storage device. If the first item of data matches at least one of the second item of data and the third item of data, the first item of data is valid. If the first item of data does not match at least one of the second item of data and the third item of data, the second item of data is valid.

In a third aspect of the present invention, a method of performing a read from a data storage system includes receiving a read request from a client for an item of data from a data storage system, the data storage system including a plurality of storage devices. Data is obtained from at least three data storage devices included in the data storage system, wherein if a device of the at least three data storage devices fails to return the requested item of data, an additional storage device is queried for corresponding data. Validity of the obtained items of data may be determined. For example, determining validity may include comparing a first item of data from a first storage device of the plurality of storage devices with a second item of data from a second storage device of the plurality of storage devices and a third item of data from a third storage device of the plurality of devices. If the first item of data matches at least one of the second item of data and the third item of data, the first item of data is valid. If the first item of data does not match at least one of the second item of data and the third item of data, the second item of data is valid.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown. One method and system utilized to promote data integrity is a redundant array of inexpensive disks (RAID) system, which may provide a group of drives in a system that will continue to provide access to data even in the event of drive failure. However, data corruption may still occur in a RAID system. For example, data corruption may occur wherein disk drives erroneously report successful completion of WRITE commands that had not, in fact, been successfully completed. This may occur due to disk drive vendor defects, and the like. Additionally, some controllers of RAID system may not handle "unreliable drive" type errors. By providing a system and method for data verification in a RAID system, data integrity may be further promoted, even over the advantages typically provided in a RAID system.

Figure 1:
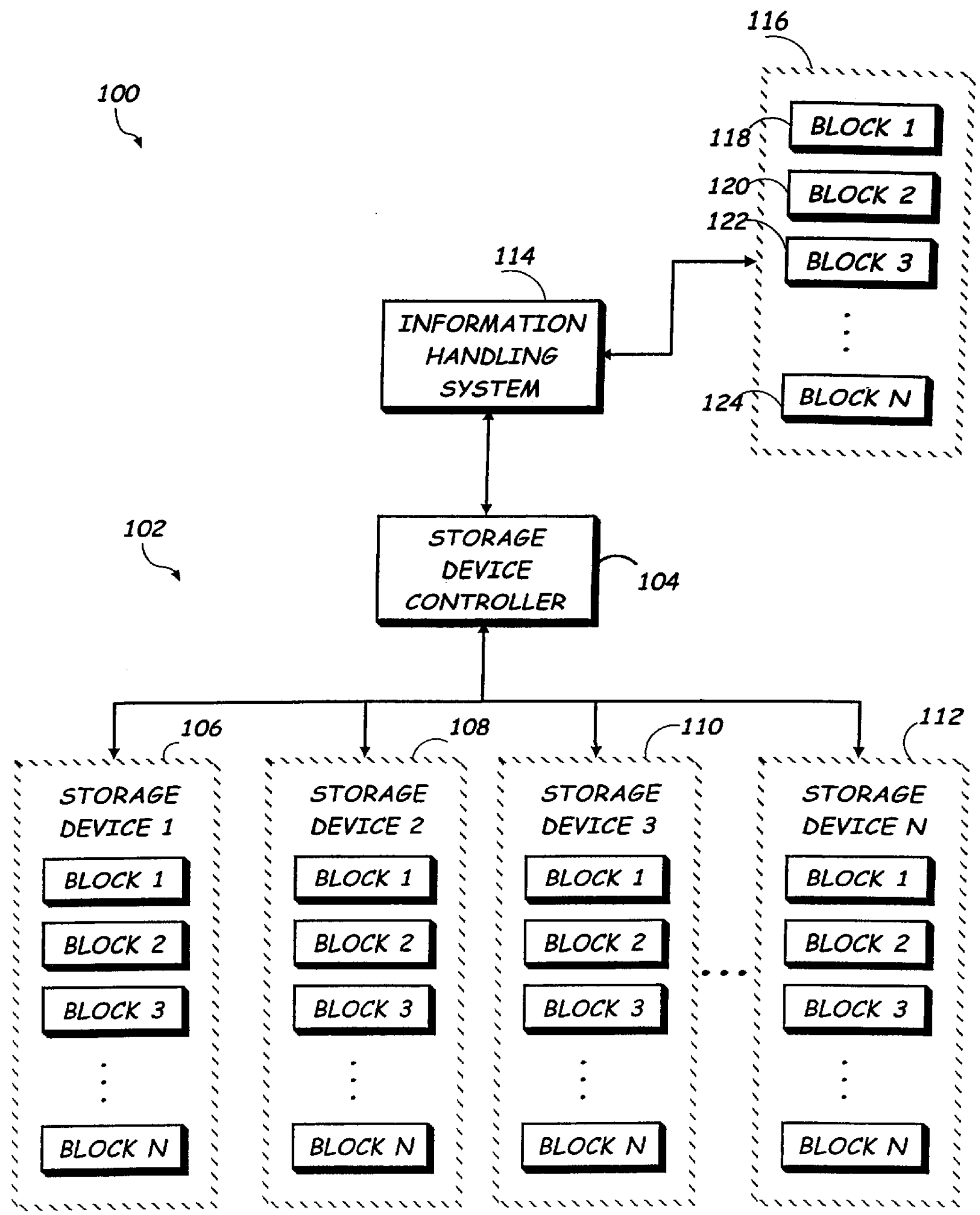
FIG. 1 is a block diagram illustrating an embodiment of the present invention wherein an information handling system is coupled to an electronic data storage system includes a first data storage device, a second data storage device and a third data storage device each of which have corresponding items of data stored thereon.

Referring now to FIG. 1, an embodiment 100 of the present invention is shown wherein an information handling system is coupled to an electronic data storage system, which includes a first data storage device, a second data storage device and a third data storage device having corresponding items of data stored thereon. An electronic data storage system 102 may include a storage device controller 104 and a plurality of storage devices, such as storage device 1 106, storage device 2 108, storage device 3 110 and up to storage device N 112. Writing data to the storage devices 106, 108, 110 & 112 simultaneously may be utilized to mirror data.

For example, an information handling system 114, such as a server, desktop computer, and the like, may receive an initial set of data 116 including block 1 118, block 2 120, block 3 122 and block n 124 and wish to store that data in a persistent manner on an electronic data storage system 102. The storage device controller 104 receives the initial set of data 116 and sends the data to the storage devices 106, 108, 110 & 112. The storage devices 106, 108, 110 & 112 then write the data, so that each storage device has a corresponding copy of the initial set of data. Thus, if a storage device became inaccessible, such as storage device 1 106, data may be retrieved from a second storage device, such as storage device 2 108. Such a method of data saving includes RAID 1.

However, a storage device failure may occur wherein the data on the storage devices becomes corrupted. For example, a storage device may appear to be operating within parameters, but in actual operation does not perform the write function successfully. Thus, a corrupted data condition may occur, which may result in incorrect data results, errors, and the like. By utilizing the present invention, data may be verified by comparing the data stored on the storage devices. In this way, corrupted data may be identified and even corrected.

Figure 2:
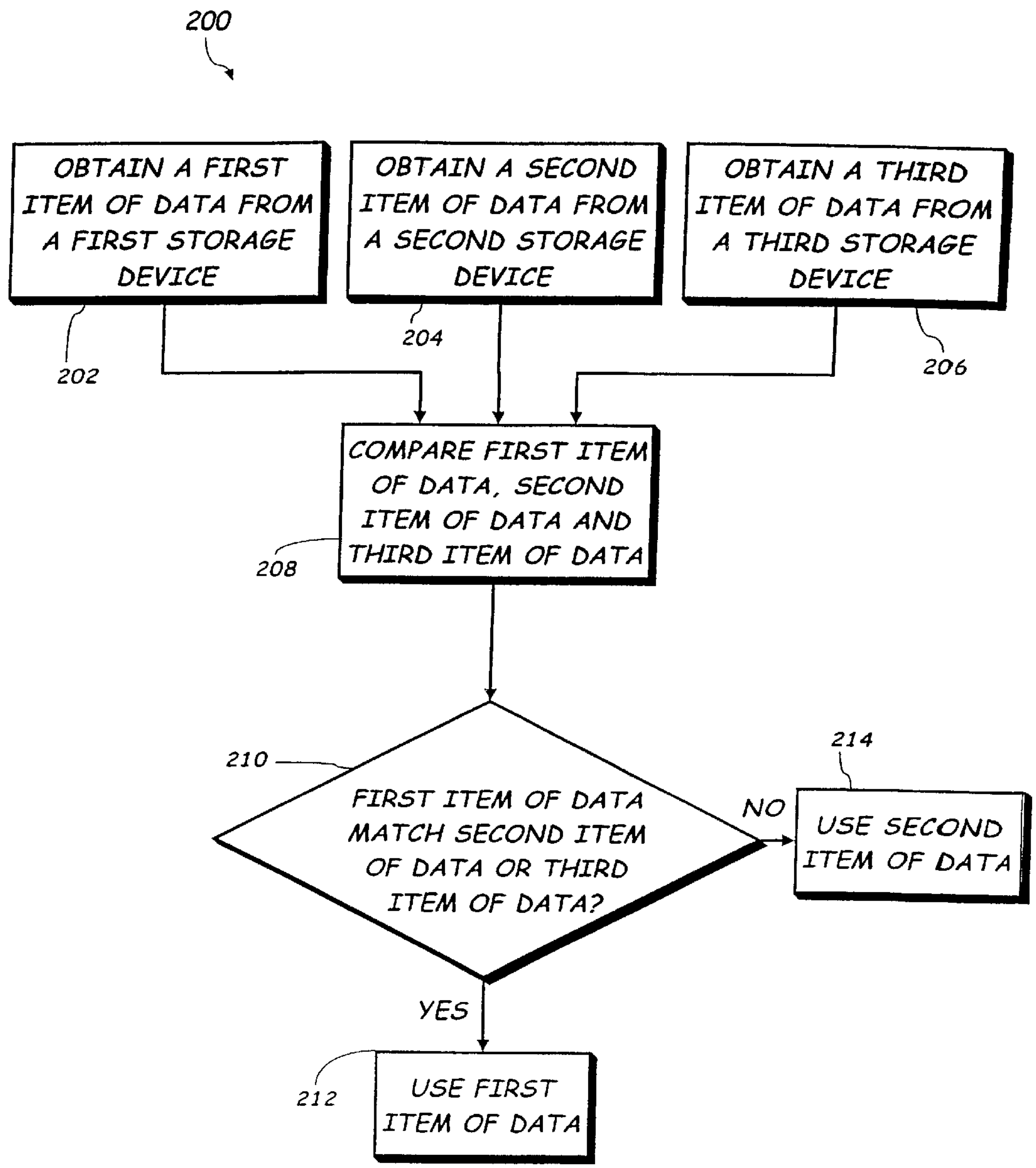
FIG. 2 is a flow diagram depicting an exemplary method of the present invention wherein a first item of data, a second item of data and a third item of data are retrieved from separate storage devices and compared to promote the validity of the data.

Referring now to FIG. 2, an exemplary method 200 of the present invention is shown wherein a first item of data, a second item of data and a third item of data are retrieved from separate storage devices and compared to promote the validity of the data. Preferably, the items of data their respective drives in a data storage system to create "N" exact copies of the same data. However, as stated previously, write errors, interruptions, and the like may occur which corrupt the data. Therefore, by verifying the data items, integrity of the data may be ensured.

For example, a first item of data may obtained from a first storage device 202, a second item of data obtained from a second storage device 204, and a third item of data obtained from a third storage device 206. The first item of data, second item of data and third item of data are compared 208. If the first item of data matches the second item of data and/or the third item of data 210, the first item of data is used 212, such as by transmitting the first item of data to a client. However, if the first item of data does not match the second item of data or the third item of data 210, the second item of data is used 214. Thus, validity of data may be established, and the data returned to a client. One benefit of this approach is that it provide protection against "silent" data corruption that may occur at any given storage device, yet requires no additional metadata to be computed/stored during writes or fetched/validated during reads. Furthermore, by reading only three drives at a time in the present example, overhead is reduced fro more extensive approaches of reading all drive. In this way, the likelihood of accepting corrupt data is diminished by the verification of data between drives.

Referring generally now to FIGS. 3A through 3D, embodiments of the present invention are shown wherein data selection choices made by utilizing the present invention in different data corruption scenarios are described. Corruption to items of data in data storage devices may occur in a variety of ways, such as through an interruption during a write, storage device error, system error, and the like. Due to the importance of the data written to devices, it is desirable to determine which item of data of the items of data stored on the storage devices is valid.

Figure 3A:
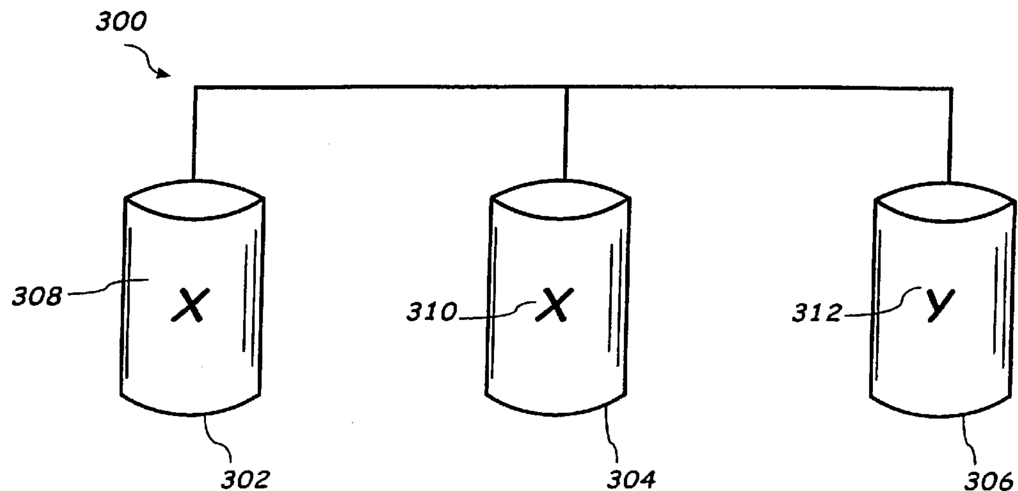
FIGS. 3A, 3B, 3C and 3D are illustrations of embodiments of the present invention wherein data selection choices made by utilizing the present invention in different data corruption scenarios are shown.

For example, referring now to the embodiment 300 depicted in FIG. 3A, a first data storage device 302, a second data storage device 304 and a third data storage device 306 is shown. Each storage device 302, 304 & 306 includes an item of data written based on an initial item of data. In this instance, the first storage device 302 includes an item of data 308 that matches the second item of data 310 included on the second storage device 304. However, the third item of data 312 of the third storage device 306 does not match the first item of data 308 from the first storage device 302. By utilizing the present invention, since the first item of data 308 matches the second item of data 310, the first item of data 308 is used, such as by returning the first item of data 308 to a client as part of a database transaction.

Figure 3B:
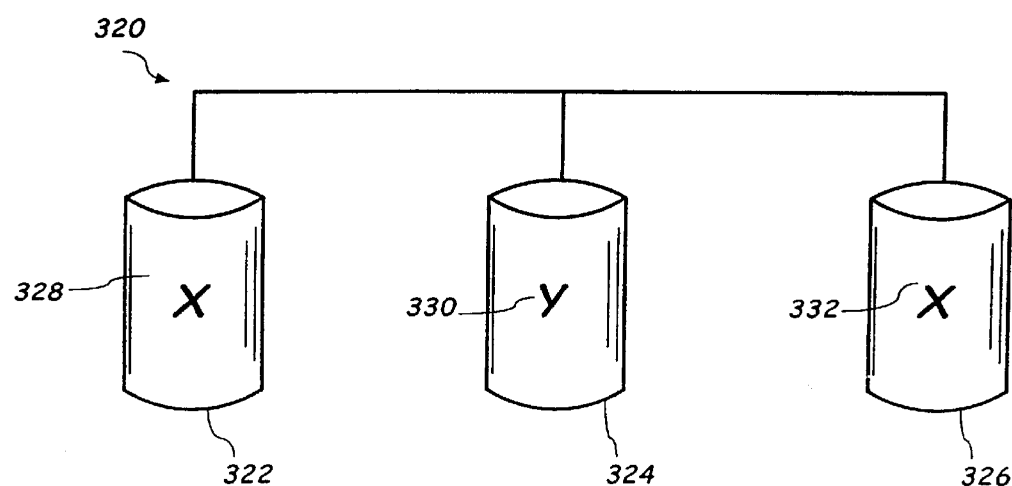

Likewise, referring now to the embodiment 320 depicted in FIG. 3B, a first data storage device 322, a second data storage device 324 and a third data storage device 326 each include an item of data written based on an initial item of data. In this instance, the first storage device 322 includes an item of data 328 that matches the third item of data 332 included on the third storage device 326. However, the second item of data 330 of the second storage device 324 does not match the first item of data 328 from the first storage device 322. By utilizing the present invention, since the first item of data 328 matches the third item of data 332, the first item of data 328 is used.

Figure 3C:
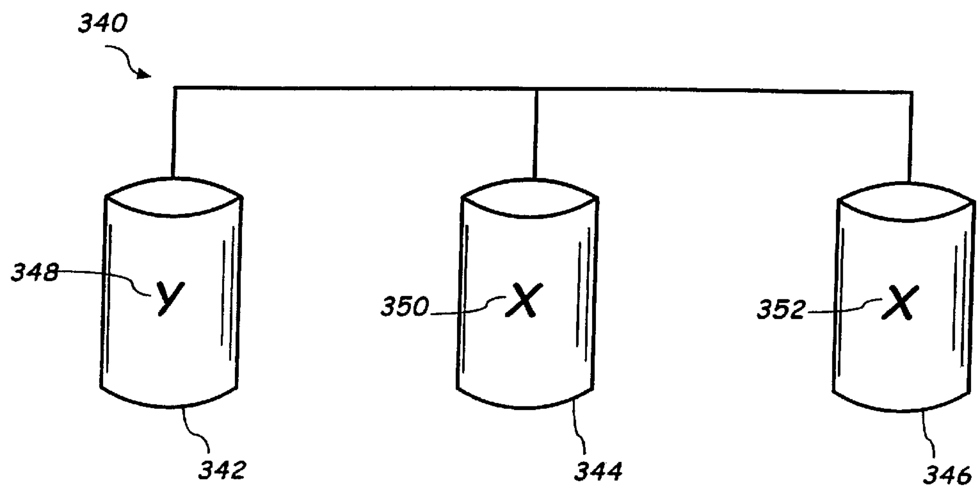

Referring now to FIG. 3C, an embodiment 340 of the present invention is shown wherein a first item of data does not match the second item of data or the third item of data. A first storage device 342 includes a first item of data 348, that does not match a second item of data 350 included on a second storage device 344, not does the first item of data 348 match a third item of data 352 included on a third storage device 346. In this instance, the second item of data 350 does match the third item of data 352. In this situation, since the first item does not match the second item of data 350 or the third item of data 352, the second item of data 350 is used.

Figure 3D:
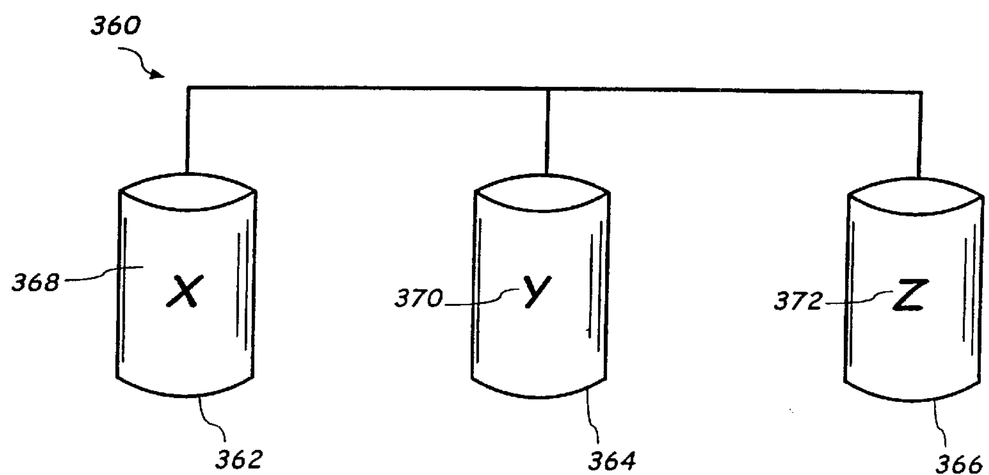

Referring now to FIG. 3D, an embodiment 360 of the present invention is shown wherein data items included on the storage devices do not match. A first data storage device 362, a second data storage device 364 and a third data storage device 366 each include an item of data written based on an initial item of data. In this instance, the first storage device 362 includes an item of data 368 that does not match a second item of data 370 included on the second storage device 364, nor does the first item of data 368 match a third item of data 372 included on the third storage device 366. Additionally, the second item of data 370 of the second storage device 364 does not match the third item of data 372 from the third storage device 366. By utilizing the present invention, since the first item of data 368 does not match the second item of data 370 or the third item of data 372, the second item of data 370 is used.

Figure 4:
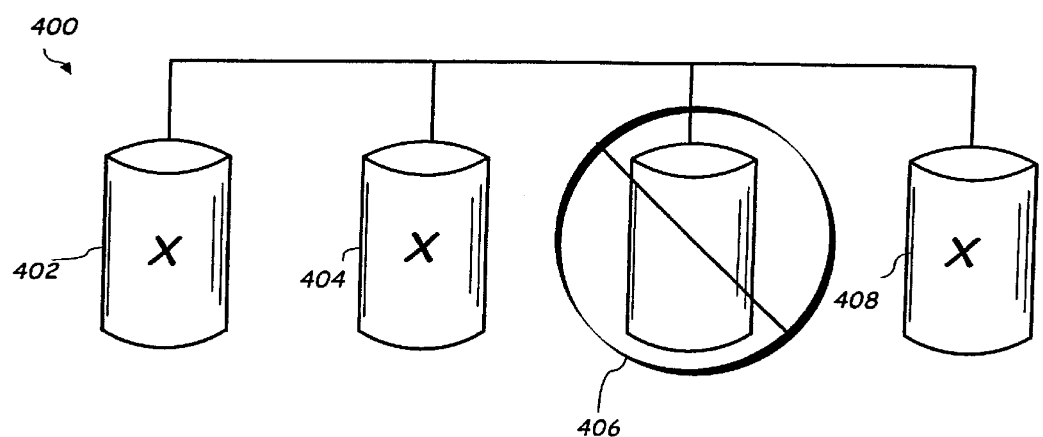
FIG. 4 is an illustration of an exemplary embodiment of the present invention wherein if an error occurs during a reading of a given storage device, an additional storage device from the storage system is selected to provide a corresponding item of data.

Referring now to FIG. 4, an embodiment 400 of the present invention is shown wherein if an error occurs during a reading of a given storage device, an additional storage device from the storage system is selected to provide a corresponding item of data. Preferable, in the present invention, a read operation is performed in which data is read from three different storage devices. A round-robin storage device selection method may be used for selecting storage devices from a storage device system from which to read. If an error occurs when reading from a given drive, another drive may be selected and a read performed. For example, a read may be performed in which a first storage device 402 and a second storage device 404 return values. However, an error may occur in response to a request for data from a third storage device 406, such as the device is unavailable, malfunctioning, and the like. This may continue until three distinct data points have been established, or until no additional drives are available for reading. For instance, a fourth storage device 408 may be selected to provide the third set of data. Once the data points are established, a comparison in accordance with the present invention may be performed.

Figure 5:
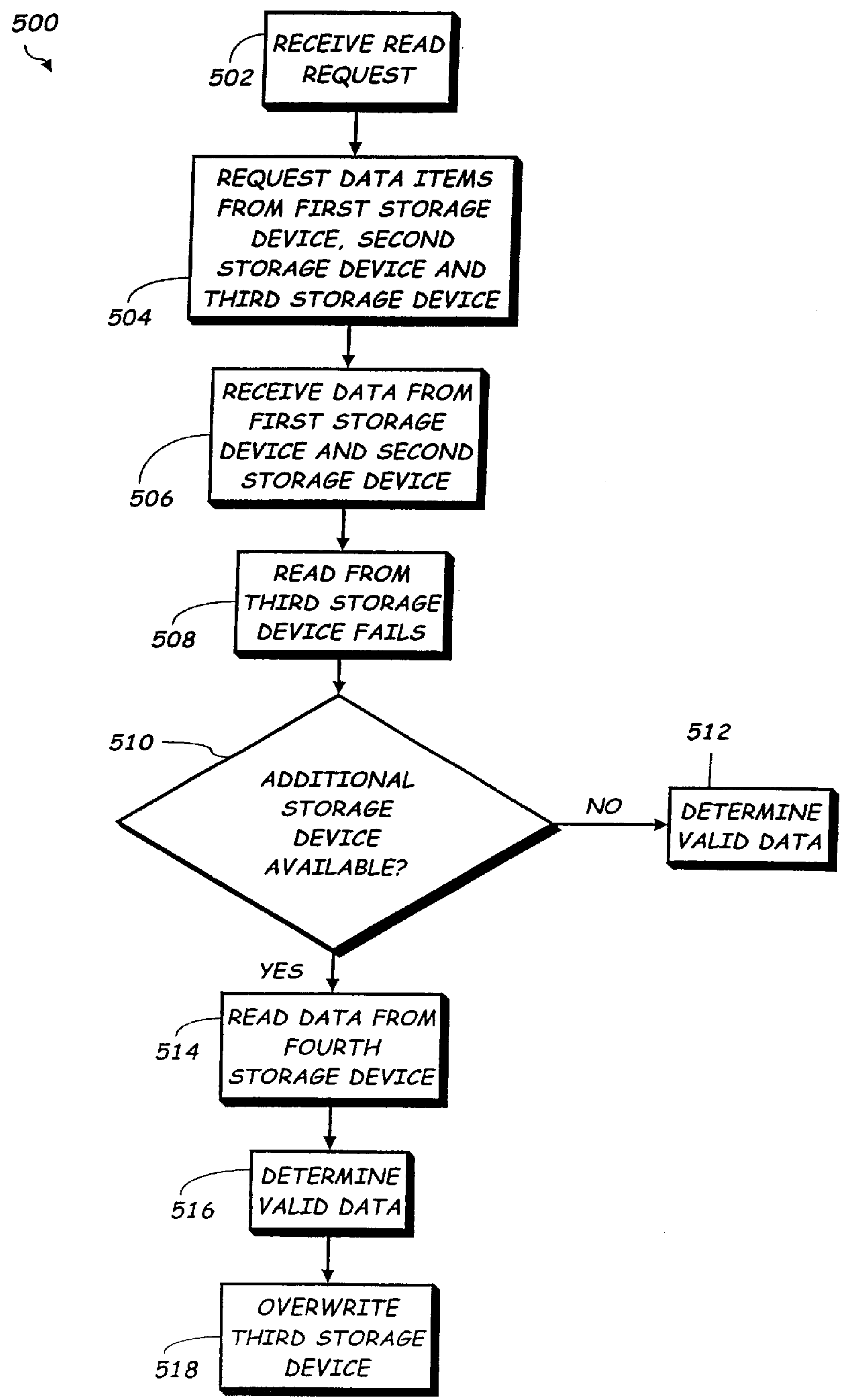
FIG. 5 is a flow diagram illustrating an exemplary method of the present invention wherein retrieval of items of data from a data storage system in accordance with an embodiment of the present invention is shown.

Referring now to FIG. 5, an exemplary method 500 of the present invention is shown wherein retrieval of items of data from a data storage system in accordance with an embodiment of the present invention. A storage system receives a read request 502, such as for an item of data in a database transaction. Data items are requested from a first storage device, a second storage device, and a third storage device 504. Data is received from the first storage device and the second storage device 506. However, the read from the third storage device has failed 508, thereby not returning the requested item of data. If there is not an additional storage device available 510, the determination of valid data is performed 512 utilizing the available data. If there is an additional storage device available, data is read from the fourth storage device 514 and a determination is made of the validity of the data 516. Additionally, it may be desirable to correct the data condition after the return of the requested data to a client by overwriting the third storage device with the valid data 518. If the attempt again fails, the storage device may be marked as "failed" for appropriate action by the storage device controller and/or client. If the attempt is successful, the device may continue to operate normally in the data storage system.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems. Until required by an information handling system, the set of instructions may be stored in another readable memory device, for example in a hard disk drive or in a removable memory such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for data verification of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of reading data in a data storage system including a first data storage device, a second data storage device and a third data storage device, comprising:

reading a first item of data from a first data storage device, a second item of data from a second data storage device, and a third item of data from a third storage device;

comparing the first item of data from the first storage device with the second item of data from the second storage device and the third item of data from the third storage device, wherein if the first item of data matches at least one of the second item of data and the third item of data, the first item of data is valid, and if the first item of data does not match at least one of the second item of data and the third item of data, the second item of data is valid.

2. The method as described in claim 1, wherein if the first item of data matches the second item of data but does not match the third item of data, the third item of data is invalid.

3. The method as described in claim 2, wherein the third item of data is overwritten by the first item of data.

4. The method as described in claim 3, wherein a failure occurs in overwriting the third item of data, the third storage device is marked as failed.

5. The method as described in claim 3, wherein the third item of data is overwritten successfully by the first item of data, the third storage device remains in service in the data storage system.

6. The method as described in claim 1, wherein the valid data is returned to a client.

7. The method as described in claim 1, further comprising selecting the first data storage device, the second data storage device and the third data storage device from a plurality of data storage devices.

8. The method as described in claim 7, wherein if an error occurs when reading from a data storage device from the plurality of data storage devices, a new data storage device from the plurality of data storage devices is selected.

9. The method as described in claim 8, wherein selecting continues until at least one of three data storage devices are available and no additional data storage devices are available.

10. The method as described in claim 8, wherein the new data storage device replaces the data storage device having the error.

11. A data storage system, comprising:

a first storage device suitable for storing electronic data, the first storage device including a first item of data;

a second storage device suitable for storing electronic data, the second storage device including a second item of data;

a third storage device suitable for storing electronic data, the third storage device including a third item of data; and a storage device controller coupled to the first data storage device, the second data storage device and the third data storage device, wherein the storage device controller reads the first item of data from the first storage device, the second item of data from the second storage device and the third item of data from the third storage device and compares the first item of data from the first storage device with the second item of data from the second storage device and the third item of data from the third storage device wherein if the first item of data matches at least one of the second item of data and the third item of data, the first item of data is valid, and if the first item of data does not match at least one of the second item of data and the third item of data, the second item of data is valid.

12. The data storage system as described in claim 11, wherein if the first item of data matches the second item of data but does not match the third item of data, the third item of data is invalid.

13. The data storage system as described in claim 12, wherein the third item of data is overwritten by the first item of data.

14. The data storage system as described in claim 13, wherein a failure occurs in overwriting the third item of data, the third storage device is marked as failed.

15. The data storage system as described in claim 13, wherein the third item of data is overwritten successfully by the first item of data, the third storage device remains in service in the data storage system.

16. The data storage system as described in claim 13, wherein the valid data is returned to a client.

17. The data storage system as described in claim 11, further comprising selecting the first data storage device, the second data storage device and the third data storage device from a plurality of data storage devices.

18. The data storage system as described in claim 17, wherein if an error occurs when reading from a data storage device from the plurality of data storage devices, a new data storage device from the plurality of data storage devices is selected.

19. The data storage system as described in claim 18, wherein selecting continues until at least one of three data storage devices are available and no additional data storage devices are available.

20. The data storage system as described in claim 18, wherein the new data storage device replaces the data storage device having the error.

21. A method of performing a read from a data storage system, comprising:

receiving a read request from a client for an item of data from a data storage system, the data storage system including a plurality of storage devices; and obtaining data from at least three data storage devices included in the data storage system, wherein if a device of the at least three-data storage devices fails to return the requested item of data, an additional storage device is queried for corresponding data.

22. The method as described in claim 21, wherein if a first storage device of the at least thee data storage devices fails to return the requested item of data, an item of data from a second storage device is written to the first storage device.

23. The method as described in claim 21, further comprising determining validity of the obtained items of data.

24. The method as described in claim 23, wherein determining validity includes comparing a first item of data from a first storage device of the plurality of storage devices with a second item of data from a second storage device of the plurality of storage devices and a third item of data from a third storage device of the plurality of devices, wherein if the first item of data matches at least one of the second item of data and the third item of data, the first item of data is valid, and if the first item of data does not match at least one of the second item of data and the third item of data, the second item of data is valid.

25. A method of reading data in a RAID data storage system including a first disk drive, a second disk drive and a third disk drive for storage of data, comprising:

reading a first item of data from the first disk drive, a second item of data from the second disk drive, and a third item of data from the third disk drive;

comparing the first item of data read from the first disk drive with the second item of data read from the second disk drive and the third item of data read from the third disk drive, wherein if the first item of data matches at least one of the second item of data and the third item of data, the first item of data is valid, and if the first item of data does not match at least one of the second item of data and the third item of data, the second item of data is valid.

26. The method as described in claim 25, wherein if the first item of data matches the second item of data but does not match the third item of data, the third item of data is invalid.

27. The method as described in claim 26, further comprising overwriting the third item of data by the first item of data.

28. The method as described in claim 27, further comprising marking the third storage device as failed if a failure occurs in overwriting the third item of data.

29. The method as described in claim 27, wherein if the third item of data is overwritten successfully by the first item of data, the third storage device remains in service in the data storage system.

30. The method as described in claim 25, further comprising returning the valid data to a client.

31. The method as described in claim 25, further comprising selecting the first data storage device, the second data storage device and the third data storage device from a plurality of data storage devices.

32. The method as described in claim 31, further comprising selecting a new data storage device from the plurality of data storage devices if an error occurs when reading from a data storage device from the plurality of data storage devices.

33. The method as described in claim 32, wherein selecting continues until at least one of three data storage devices are available and no additional data storage devices are available.

34. The method as described in claim 32, wherein the new data storage device replaces the data storage device having the error.

* * * * *